US009924229B2

(12) United States Patent
McCoy et al.

(10) Patent No.: US 9,924,229 B2
(45) Date of Patent: Mar. 20, 2018

(54) EMPLOYMENT OF MULTIPLE SECOND DISPLAYS TO CONTROL IPTV CONTENT

(75) Inventors: Charles McCoy, Coronado, CA (US);
Ling Jun Wong, Escondido, CA (US);
True Xiong, San Diego, CA (US)

(73) Assignees: SONY NETWORK ENTERTAINMENT INTERNATIONAL LLC, Los Angeles; SONY CORPORATION, Tokyo (JP)

( * ) Notice: Subject to any disclaimer, the term of this patent is extended or adjusted under 35 U.S.C. 154(b) by 683 days.

(21) Appl. No.: 12/982,368

(22) Filed: Dec. 30, 2010

(65) Prior Publication Data

US 2012/0117586 A1    May 10, 2012

Related U.S. Application Data (60) Provisional application No. 61/412,308, filed on Nov. 10, 2010, provisional application No. 61/411,565, filed on Nov. 9, 2010.

(51) Int. Cl.
*H04N 21/472* (2011.01)
*H04N 21/4722* (2011.01)
(Continued)

(52) U.S. Cl.
CPC ..... *H04N 21/4722* (2013.01); *H04N 21/4126* (2013.01); *H04N 21/4782* (2013.01);
(Continued)

(58) Field of Classification Search
CPC ............. H04N 21/222; H04N 21/2228; H04N 21/237; H04N 21/2396; H04N 21/2541;
(Continued)

(56) References Cited

U.S. PATENT DOCUMENTS 7,392,393 B2 * 6/2008 Taki ........................ G06F 21/10
348/E7.071
7,886,318 B2 * 2/2011 Wang et al. .................... 725/25
(Continued)

FOREIGN PATENT DOCUMENTS

WO    2009052650    4/2009

OTHER PUBLICATIONS

Ignacio Mas, Viktor Berggren, Rittwik Jana, John Murray, Christopher V. Rice; "IPTV Session Mobility", Jun. 12, 2009.

*Primary Examiner* — Nicholas Corbo
*Assistant Examiner* — Reuben M Brown
(74) *Attorney, Agent, or Firm* — Mayer & Williams, PC; Mark D. Wieczorek (57) ABSTRACT

Disclosed are systems and methods to enable a multiple users browsing content offerings on multiple devices to have their selections played by a content playback device using its own authentication credentials. The users can then continue to browse the content offerings on their multiple second displays without interrupting the content that is playing on the main content playback device. The method is an architecture design and implementation that allows users to navigate, browse, and search content offerings on a second display such as a smart phone, PC, laptop, tablet, internet appliance, or any other device with a capability to couple to a network. Concurrently, while a user is using the content playback device, another user can perform browsing activities on a second display and send a media selection to a primary content playback device of the user's choice for queueing and/or playback.

23 Claims, 8 Drawing Sheets

(51) Int. Cl.

| | | |
|---|---|---|
| *H04N 21/41* | (2011.01) | |
| *H04N 21/4782* | (2011.01) | |
| *H04N 21/222* | (2011.01) | |
| *H04N 21/254* | (2011.01) | |
| *H04N 21/6332* | (2011.01) | |
| *H04N 21/475* | (2011.01) | |
| *H04N 21/835* | (2011.01) | |
| *H04N 21/4627* | (2011.01) | |
| *H04N 21/6334* | (2011.01) | |
| *H04N 21/239* | (2011.01) | |
| *H04N 21/441* | (2011.01) | |
| *H04N 21/4367* | (2011.01) | |
| *H04N 21/258* | (2011.01) | |
| *H04N 21/237* | (2011.01) | |
| *H04N 21/4415* | (2011.01) | |

(52) U.S. Cl.
CPC ........ *H04N 21/222* (2013.01); *H04N 21/237* (2013.01); *H04N 21/2396* (2013.01); *H04N 21/2541* (2013.01); *H04N 21/25816* (2013.01); *H04N 21/4367* (2013.01); *H04N 21/441* (2013.01); *H04N 21/4415* (2013.01); *H04N 21/4627* (2013.01); *H04N 21/475* (2013.01); *H04N 21/6332* (2013.01); *H04N 21/63345* (2013.01); *H04N 21/835* (2013.01)

(58) Field of Classification Search
CPC ....... H04N 21/25816; H04N 21/25825; H04N 21/25875; H04N 21/4367; H04N 21/441; H04N 21/4415; H04N 21/4627; H04N 21/475; H04N 21/4751; H04N 21/4753; H04N 21/6332; H04N 21/6334; H04N 21/63345; H04N 21/4722; H04N 21/4126; H04N 21/4782; H04N 21/835
USPC ....... 725/61, 62, 25, 30, 141, 150, 151, 119, 725/120
See application file for complete search history.

(56) References Cited

U.S. PATENT DOCUMENTS

| | | | |
|---|---|---|---|
| 7,895,445 B1* | 2/2011 | Albanese et al. | 713/185 |
| 7,933,970 B2* | 4/2011 | Zimler et al. | 709/217 |
| 8,346,924 B1* | 1/2013 | Bucher et al. | 709/225 |
| 2003/0018753 A1* | 1/2003 | Seki | 709/219 |
| 2003/0097655 A1* | 5/2003 | Novak | 725/31 |
| 2004/0054787 A1* | 3/2004 | Kjellberg et al. | 709/228 |
| 2005/0010769 A1* | 1/2005 | You et al. | 713/168 |
| 2006/0104442 A1* | 5/2006 | Han et al. | 380/44 |
| 2006/0149845 A1* | 7/2006 | Malin et al. | 709/228 |
| 2006/0215650 A1* | 9/2006 | Wollmershauser et al. | 370/389 |
| 2007/0005990 A1* | 1/2007 | Sathish | H04L 67/14 713/189 |
| 2008/0060043 A1* | 3/2008 | Malik | 725/134 |
| 2008/0125104 A1* | 5/2008 | You et al. | 455/418 |
| 2008/0127255 A1* | 5/2008 | Ress et al. | 725/38 |
| 2008/0134276 A1* | 6/2008 | Orrell et al. | 725/132 |
| 2008/0141313 A1* | 6/2008 | Kato et al. | 725/62 |
| 2008/0168568 A1* | 7/2008 | Brodersen | G06F 21/10 726/30 |
| 2009/0007187 A1 | 1/2009 | Koul | |
| 2009/0113539 A1* | 4/2009 | Shu | H04L 12/2821 726/12 |
| 2009/0210552 A1 | 8/2009 | Ozugur et al. | |
| 2009/0222874 A1 | 9/2009 | White | |
| 2009/0235317 A1* | 9/2009 | Igarashi | 725/82 |
| 2009/0320077 A1* | 12/2009 | Gazdzinski | 725/62 |
| 2010/0167656 A1* | 7/2010 | Zhang | H04N 21/4334 455/66.1 |
| 2010/0217837 A1* | 8/2010 | Ansari et al. | 709/218 |
| 2010/0235868 A1* | 9/2010 | Howarter et al. | 725/82 |
| 2011/0041065 A1* | 2/2011 | Bangma et al. | 715/733 |
| 2011/0131332 A1* | 6/2011 | Bouazizi | 709/227 |
| 2011/0252451 A1* | 10/2011 | Turgeman et al. | 725/82 |
| 2011/0258329 A1* | 10/2011 | Lee et al. | 709/227 |
| 2011/0296506 A1* | 12/2011 | Caspi | 726/6 |
| 2012/0117586 A1* | 5/2012 | McCoy et al. | 725/25 |
| 2012/0137322 A1* | 5/2012 | Kushalnagar et al. | 725/31 |
| 2012/0204216 A1* | 8/2012 | Connelly et al. | 725/106 |
| 2012/0278457 A1* | 11/2012 | Yasrebi et al. | 709/221 |
| 2012/0291104 A1* | 11/2012 | Hasek | 726/4 |
| 2013/0074122 A1* | 3/2013 | Hicks et al. | 725/35 |
| 2014/0310754 A1* | 10/2014 | Collart et al. | 725/74 |

* cited by examiner

EMPLOYMENT OF MULTIPLE SECOND DISPLAYS TO CONTROL IPTV CONTENT

CROSS-REFERENCE TO RELATED APPLICATIONS

This application claims benefit of priority of U.S. Provisional Patent Application No. 61/411,565, filed Nov. 9, 2010, entitled "Sony Worldwide BIVL IPTV Service Infrastructure for Second BIVL Display Device", and U.S. Provisional Patent Application No. 61/412,308, filed Nov. 10, 2010, entitled "Multiple BIVL Browsing Sessions for Multiple $2^{nd}$ Displays for a Single IPTV", both owned by the assignee of the present invention and herein incorporated by reference in their entireties. Also incorporated by reference in their entireties are co-owned U.S. patent application Ser. No. 12/844,205, filed Jul. 27, 2010, entitled "Control of IPTV Using Second Device", U.S. Patent Application entitled "Second Display Support Of Character Set Unsupported On Playback Device", filed concurrently herewith, U.S. Patent Application entitled "Device Registration Process From Second Display", filed concurrently herewith, U.S. Patent Application entitled "Web Browser As Second Display Control Display", filed concurrently herewith, and U.S. Patent Application entitled "Method and Device To Control IPTV Settings From A Second Display", filed concurrently herewith.

BACKGROUND

Internet delivery of digital content to IPTVs continues to increase, giving rise to an equally challenging issue of content navigation and management. Because of the IPTV's unique situation of being a shared device that is controlled by a simple input device, it is difficult to find an ingenious solution that will resolve this issue without excessively raising hardware costs, especially for multiple users. It is impractical to make a remote controller for all possible functions, because the same will significantly increase costs. It is also difficult to navigate around a large IPTV screen, searching for content, without disturbing the viewing experience of other users. Consequently, issues of cumbersome data entry, limitations in memory and processing power, difficulties in effective content searches and the traditional, but limited, one-to-one interaction with the IPTV remain as major obstacles.

In particular, the one-to-one interaction only allows one user to browse content on the IPTV at one time, and even that navigation is with the cumbersome user interface. Even where alternative control devices have been proposed, the alternative control devices utilize their own systems and thus are still one-to-one on a system basis.

SUMMARY

The disclosed systems and methods provide a way for a group of users to exploit individual "second displays" to view, browse, and navigate content or data service offerings by service providers, e.g., internet network services, on behalf of a content playback device, e.g., IPTV, the same having authenticated credentials for playback of such content, and then arrange for a selected content item or items to be played back on the content playback device. Where multiple content playback devices are provided, an individual content playback device may be selected for content playback and presented content offerings may be customized to that device. Sessions are made common across the different screens so that the group of second displays acts as one entity when communicating with service providers. Using the system and method, different users can browse different services (or the same service but different categories) on their own private second displays without disturbing content playback.

The second displays serve as a visual aid to the IPTV, but generally do not require additional investment by the user because the same make use of a device, e.g., a smartphone, laptop computer, tablet computer, etc., which most users would already have in their possession. Such a second display is a perfect complement to an IPTV because of the second display's strength in data entry, processing power, and user experience in content management.

Multiple users using the system and method are enabled to use their personal devices like laptops, tablets, and smartphones to browse and search for content, e.g., on content servers operated by service providers, to manage such content and the presentation of authentication credentials therefore, to perform transactions, and to personalize their browsing and searching experience without disturbing the screen of the content playback device and viewing experience of other viewers. Communications with content servers may take place through a proxy server, and the proxy server presents to service providers the authentication credentials of the content playback device, so that the second displays appear to the service providers as an authenticated content playback device. Playback of proprietary content may be arranged to be prohibited on the non-authenticated device, e.g., the second display, so that security risks are minimized (although exceptions to this are described below). The application running on the second display may be a web application (scripting or non-scripting), a native application, a Java application, or any other sort of application that may work with a content playback device. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls.

The second displays may include any device that can run applications that can access content playback devices, including, but not limited to, personal computers, desktop computers, internet appliances, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

Assuming multiple services are available, the user then selects a service to browse. The service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In one aspect, the invention is directed to a method of arranging multiple browsing sessions for content selection, the selected content for playback on a content playback device, including: establishing a user account session between one second display and a proxy server, the second display further having at least one content playback device coupled to it; establishing a user account session between another second display and the proxy server through the local network; receiving a selection of a content item on the one or another second display; and causing the content playback device to request the content item from a service provider, where the content playback device requests the content item using an authentication credential, and where the same authentication credential is used no matter which second display received the selection.

Implementations of the invention may include one or more of the following. The method may further include displaying a list of content items on the one or another second display, where the list is generated at least in part using a device characteristic of the content playback device. The list may also be generated at least in part using a list of content playback devices associated with the user account, or by using a list of service providers associated with the user account. The method may further include displaying a list of content playback devices associated with the user account, and receiving a selection of which content playback device is to play back the selected content item. The causing the content playback device to request the content item may include causing the second display on which the selection was received to communicate the selection to the content playback device, for the content playback device to request the content item. Alternatively, the causing the content playback device to request the content item may include causing the second display on which the selection was received to communicate the selection to the proxy server on behalf of the content playback device. The receiving a selection of a content item may include receiving a selection of a content item at the proxy server, and the receiving at least a portion of the selected content item may include receiving a content URL at the content playback device. The establishing a session between a second display and a proxy server may include downloading an application from the proxy server to the second display.

In another aspect, the invention is directed to a non-transitory computer-readable medium, including instructions for causing a computing device to implement the above method.

In another aspect, the invention is directed to a computer program, stored on a non-transitory computer-readable medium, for causing one second display to perform the following steps, the second display associated with at least one content playback device and at least another second display: establish a session between a second display and a proxy server, the session associated with a user account on the proxy server; receive an application from the proxy server; execute the application to establish a browsing session; receive data about at least one content playback device associated with the user account; receive a list of available content items from the proxy server; receive a selection of one or more of the available content items; transmit one or more reference identifiers identifying the one or more respective content items to the proxy server, such that the one or more reference identifiers are configured to be employed at the proxy server with an authentication credential of the content playback device to request from one or more respective content servers that the one or more content items be made accessible for playback on the content playback device.

Implementations of the invention may include one or more of the following. A plurality of second displays may be associated with the at least one content playback device, and the same authentication credential of the content playback device may be used no matter which second display performed the step of transmitting one or more reference identifiers. The step of receiving data about at least one content playback device associated with the user account may include: receiving a selection from a user of one or a set of content playback devices associated with the user account, using a default content playback device, or using stored data about previously-used content playback devices. The second display may be selected from the group consisting of: a laptop computer, a tablet computer, an internet appliance, a desktop computer, and a smart phone. The list of available content items may include a list of available service providers. The step of transmitting one or more reference identifiers identifying the one or more respective content items to the proxy server may include transmitting the reference identifiers directly to the content playback device whereby the content playback device transmits a request to a service provider using its authentication credential for the identified content items. The transmitting directly may include transmitting using a transmission scheme including: wired transmissions, wireless transmissions, infrared transmissions, Bluetooth® transmissions, or over a local network. The step of transmitting one or more reference identifiers identifying the one or more respective content items to the proxy server may include transmitting the reference identifiers to the proxy server on behalf of the content playback device.

In another aspect, the invention is directed to a computer program, stored on a non-transitory computer-readable medium, for causing a proxy server to perform the following steps: receive a request to establish a session with one second display, and upon proper user authentication establish a session with the one second display, the session associated with a user account; receive a request to establish a session with another second display, and upon proper user authentication establish a session with the other second display, the session associated with the user account; transmit to the one and the other second display an application, the application allowing the one and the other second display to review content offerings using the proxy server; receive data about at least one content playback device associated with the user account; transmit to the one or another second display a list of available content items; receive from the one or another second display a selection of one or more content items for playback; and transmit to a service provider a request for the one or more content items to be made available for playback on the content playback device, the request including an authentication credential of the content playback device.

Implementations of the invention may include one or more of the following. The step of receiving data about at least one content playback device associated with the user account may include: receiving a selection from a user of one or a set of content playback devices associated with the user account, using a default content playback device, or using stored data about previously-used content playback devices. The proxy server may be further caused to perform the steps of: transmit to the one or another second display a list of available service providers; receive from the one or another second display a selection of one or more service providers; and provide to the selected service providers a service provider credential, the service provider credential associated with the user account and with the selected service provider. The proxy server may be further caused to perform the step of receiving from the one or another second display a selection of one or more content items from the selected service provider for playback. The step of receiving from the one or another second display a selection of one or more content items for playback may include receiving from the one or another second display one more respective reference identifiers identifying the one or more respective content items. The transmitted list may be customized based on at least the data about the content playback device.

Advantages of certain embodiments of the invention may include one or more of the following. Multiple second displays may browse separate content simultaneously, and may direct selected content to be played back on a content playback device. For each second display, additional and superior navigational features are provided over the case of browsing solely on an IPTV, e.g., hyperlinked text which opens a new window, as well as the convenient management of premium services from a single location. The system and method are not tied to any particular technology—generally, any appropriately-configured second display, that can operate a web browser, may be employed to control any appropriately-configured content playback device, the same providing a superior user experience in browsing service providers. The disclosed systems and methods may be useful in situations where a group are watching video clips on an IPTV; each may browse content on their own second display and may queue up selections as they are chosen. In another example, a user may watch the end of a sporting event on the IPTV while another uses a second display to select a movie to watch once the event ends. The system may employ on-device service affiliations for premium services such as are available for watching video or other online content, employing the authentication credentials of the IPTV to access premium content while still allowing safe access for browsing by a second display. Playback of a content item may be stopped on one IPTV and resumed on another. Multiple browsing sessions allow a degree of social sharing of content, enhancing content proliferation. Subscription-based services may be managed from a single location. Content browsing and queue management may be performed "on the move", and content may be queued across devices.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
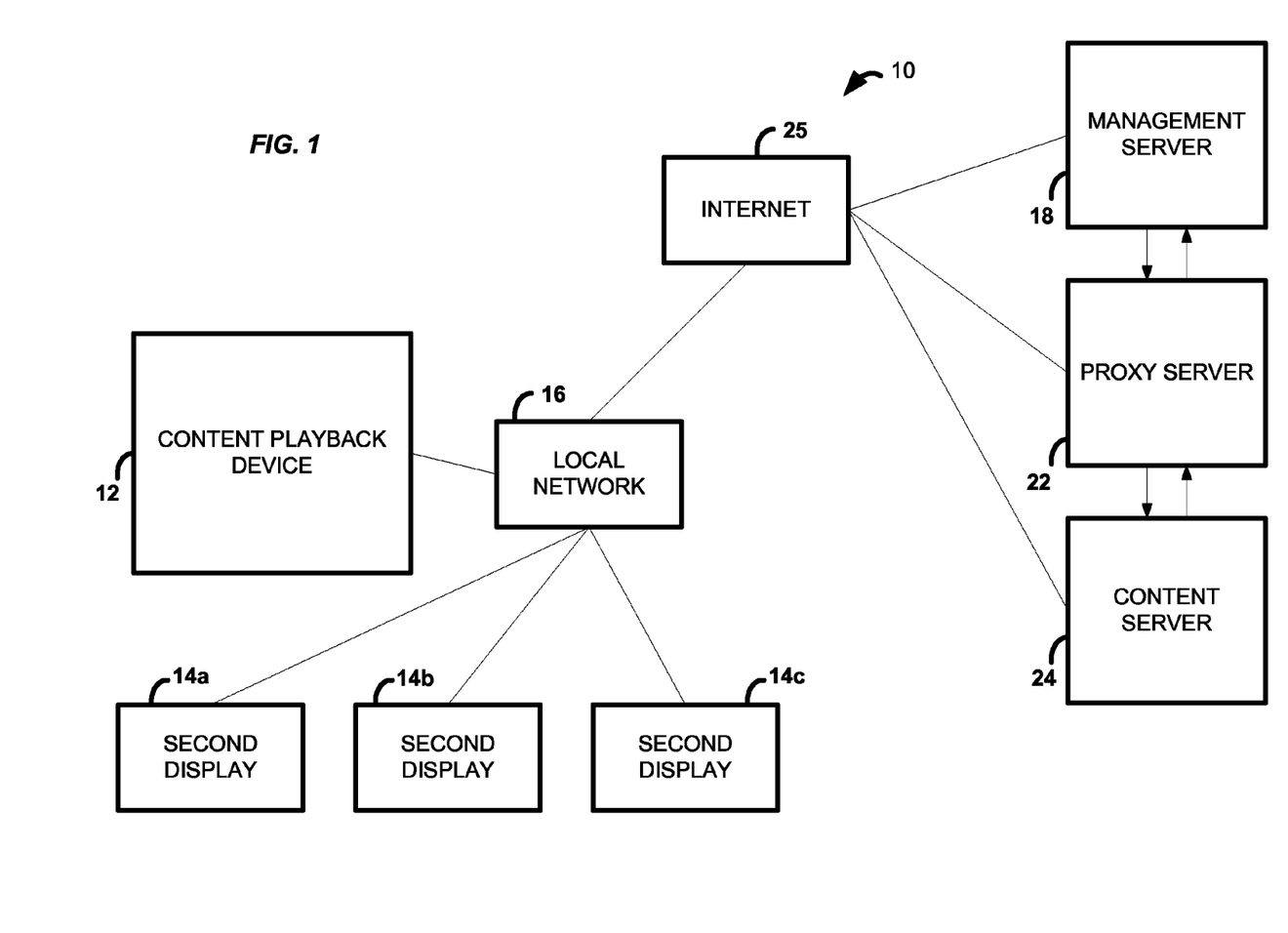
FIG. 1 is a block diagram of an exemplary system in accordance with the present principles.

Referring initially to FIG. 1, a system 10 is shown including a content playback device 12 coupled to a local network 16, which may be wired, wireless, or a combination of both. Also coupled to the local network 16 are multiple second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet, or between the second display 14i and the internet, may also take place through means besides the local network 16. For example, the second display 14i may communicate with the content playback device 12 through a separate mobile network.

One or more second displays 14a-14c are provided that each bear a processor and components necessary to operate an application, e.g., a web or browser application. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here will include a web application, but it will be understood that other types of applications may also be employed, including applications written in native code, Java, or any other such application that can allow communications with a content playback device and/or a network. The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14*i* may also select content for playback on different content playback devices. The second display 14*i* sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14*i* for presentation of information on the second display 14*i*. Responsive to a user selection of an item on the list, the second display 14*i* sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14*i*, which is presented on the second display 14*i* so that the user can navigate to enter a selection. Responsive to the selection, the second display 14*i* sends a command to the content playback device 12 to access and play back the selection.

The command to play the local content item may be in a number of forms. The second display 14*i* may communicate to the proxy server 22 the request on behalf of the content playback device 12, and this request may be via the local network or via other means. Alternatively, the second display 14*i* may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14*i* is configured to address the content playback device 12 at a non-local level, e.g., at the server level, then the second display 14*i* may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
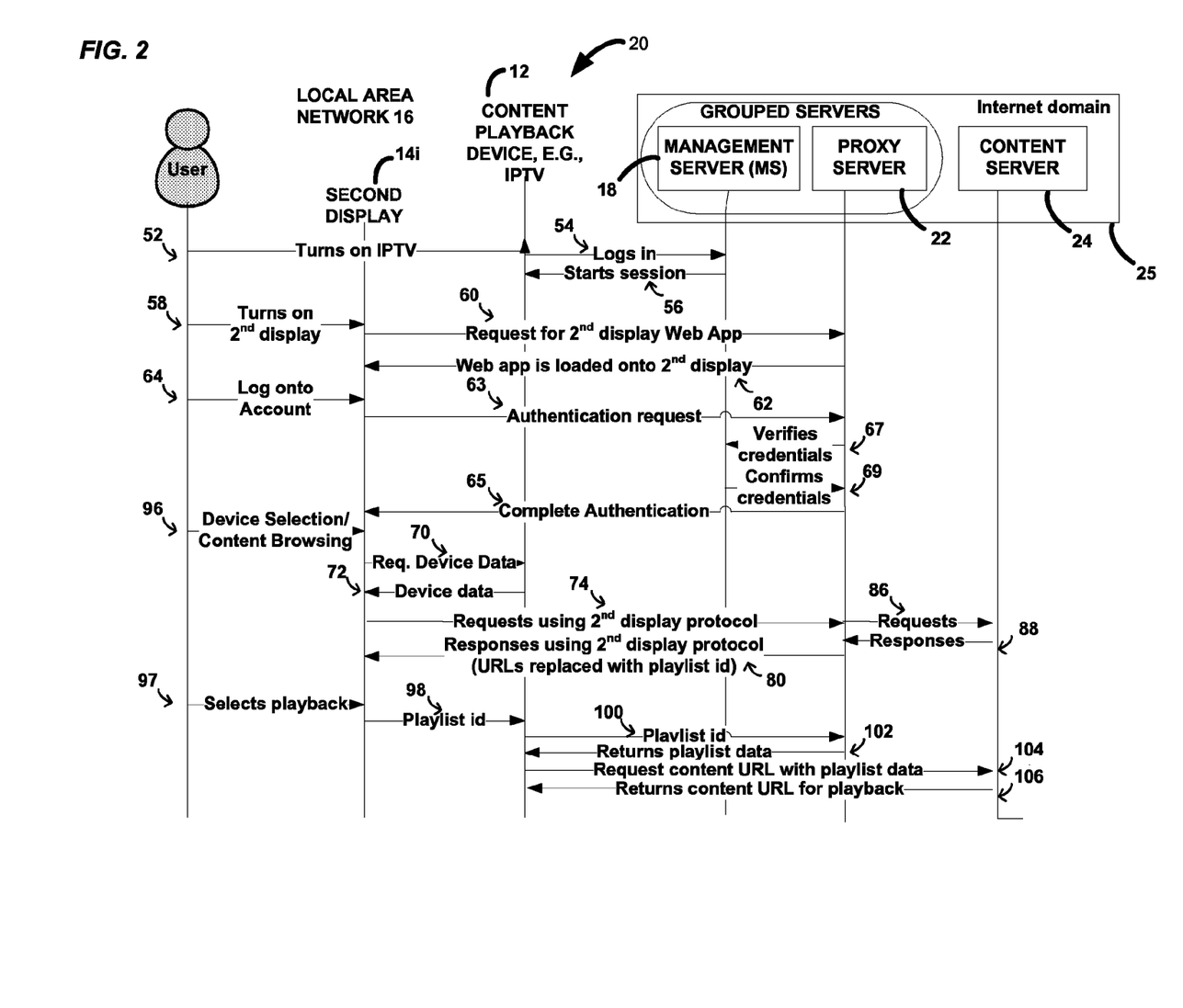
FIG. 2 is a sequence diagram illustrating the system and method according to the present principles.

FIG. 2 is a sequence diagram illustrating an exemplary implementation of the system and method for enabling a user to employ a second display to browse content playback devices, service providers, content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14*i* and, e.g., instantiates a web browser session in which control may be exercised over the content playback device. A utility is executed on the second display 14*i*, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14*i* prompts the user to input to the second display 14*i* the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14*i* in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14*i*, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14*i*, using the local IP address returned as noted above, accesses the content playback device directly, in the sense of communicating through the local network. To select a particular content playback device, the second display 14*i* requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14i and content playback device 12 are on the same local network.

Each second display 14i may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14i. That is, the proxy server 22 provides an API for the second display to use so that the content and/or content URL cannot be accessed directly, i.e., the details of the management server transactions to access the services remain desiredly unknown. In many cases, the second display 14i may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14i itself, if the same has been appropriately configured.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in Sony Infrared Remote Control System (SIRCS) protocol.

Figure 3:
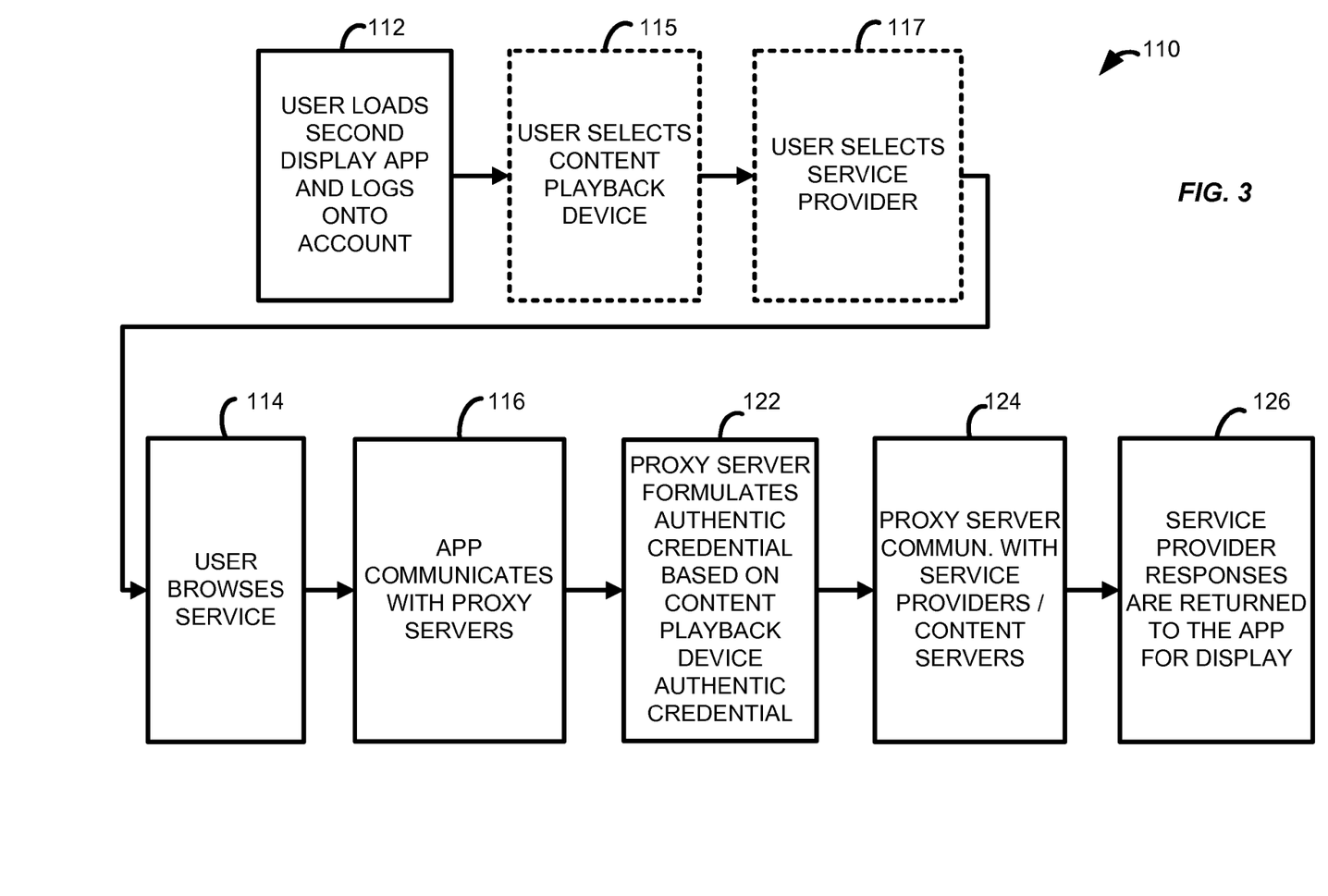
FIG. 3 is a flowchart illustrating an exemplary method according to the present principles.

FIG. 3 illustrates one exemplary method by which multiple second displays may be employed to provide a mutual browsing experience, with each user selecting content and having the content queued for eventual playback. In the flowchart of FIG. 3, a first step is that each user logs in to a user account and downloads a pertinent web application into the desired second display, e.g., a laptop (step 112).

In some cases, particularly where just one service provider is provided or affiliated with the user account, a user may immediately browse content offerings provided by a service provider (step 114). However, in other cases, an optional step may be that a user first selects a content playback device (step 115) and/or selects a service provider out of a collection of such service providers (step 117). One such technology for a collection of service providers is, e.g., the Sony Bravia Internet Video Link (BIVL™) available from Sony Electronics, Inc., of San Diego, Calif., USA.

As noted elsewhere, the selection of the content playback device allows the authentication credential of the same to be employed to access certain service providers, to customize browsing so that only content items playable on the content playback device are displayed, and so on.

The next step is that the web application communicates with one or more proxy servers (step 116). In this way the web application is prevented from directly accessing the content, thereby keeping the content secure. A next step is that the proxy server, on which is stored the authentication credentials of the content playback devices associated with the user's account, formulates the authentication tokens based on these authentication credentials and communicates the same to the service providers (step 124), e.g., content providers and their content servers. In this way, the token sent to the service provider will always be the same no matter which second display makes the request. From the service provider's point of view, it will be the content playback device who is performing the communication, not the individual second display. The token may include specific service provider credentials allowing the proxy server access to content on the content server. A next step is that the responses from the service providers are returned to the web application for display.

Figure 4:
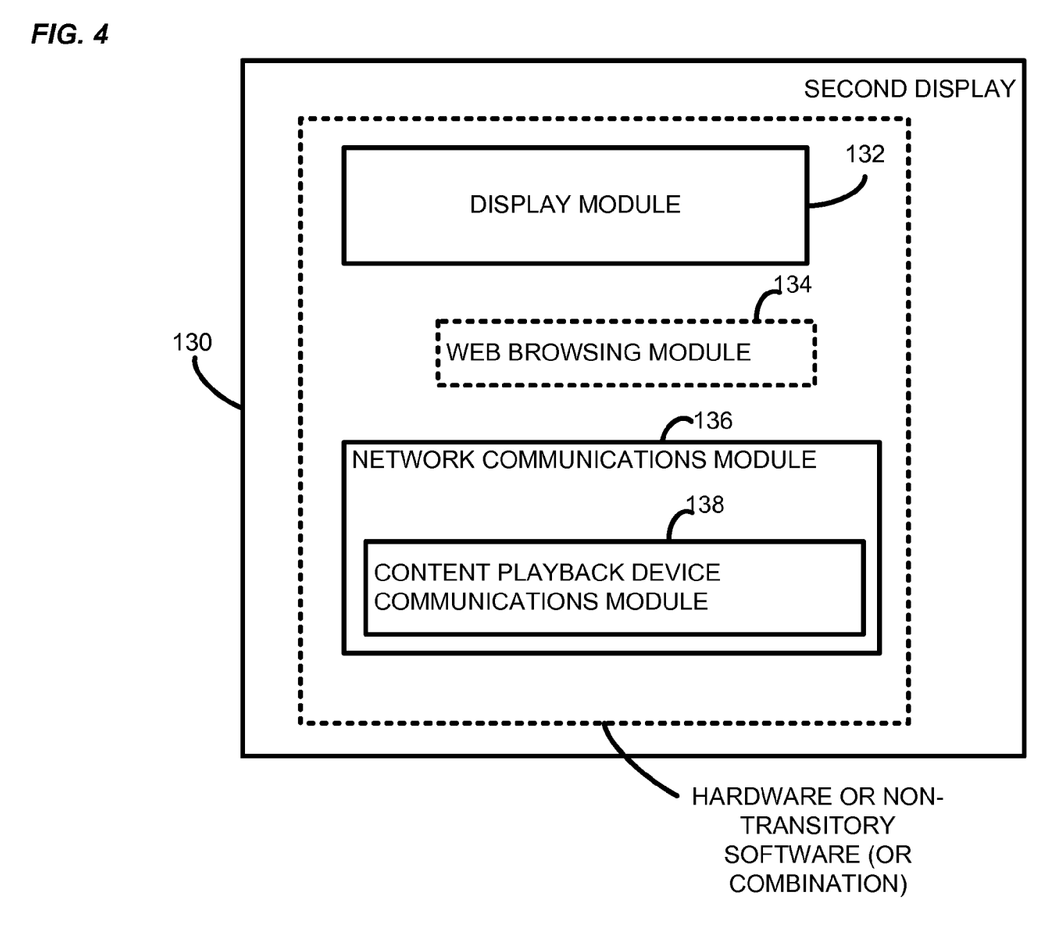
FIG. 4 is a block diagram of an exemplary second display system in accordance with the present principles.

FIG. 4 illustrates one implementation of a second display 130. The second display 130 includes a display module 132 for use in, among other aspects, browsing lists and selecting items related to the content playback device. For example, a list of content playback devices accessible to the local network and/or addressable by the second display may be displayed using the display module 132, and the user may choose a content playback device from among them. In addition to choosing a content playback device, or instead of, a user may review a list of accessible service providers using the display module 132. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 132 may display not just content accessible to the local network, but also content resident on the local network, such as content stored on a digital video recorder or Blu-ray® player.

Also within the second display 130 is an optional web browsing module 134, through which the above noted items may be browsed in the case where the second display application is written in HTML and Javascript. A web browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 134 may be replaced with a suitable other module allowing service and content selection or other such functionality.

The second display 130 also includes a module for network communications 136. The network communications module 136 allows the second display to communicate with the local network as well as, in some cases, specific devices directly. As part of the network communications module 136, a communications module 138 for communications with a content playback device is provided. The content playback device communications module 138 allows the second display to communicate with the content playback device either over the local network or directly. Such direct communications may include various types of wired or wireless transmission schemes, including Wi-Fi, USB, infrared, Bluetooth®, or the like.

It is noted that the above modules may be implemented in hardware, non-transitory software, or a combination of the above. Typically, the same will be implemented within the context of a laptop computer, a tablet computer, a smart phone, or the like.

Figure 5:
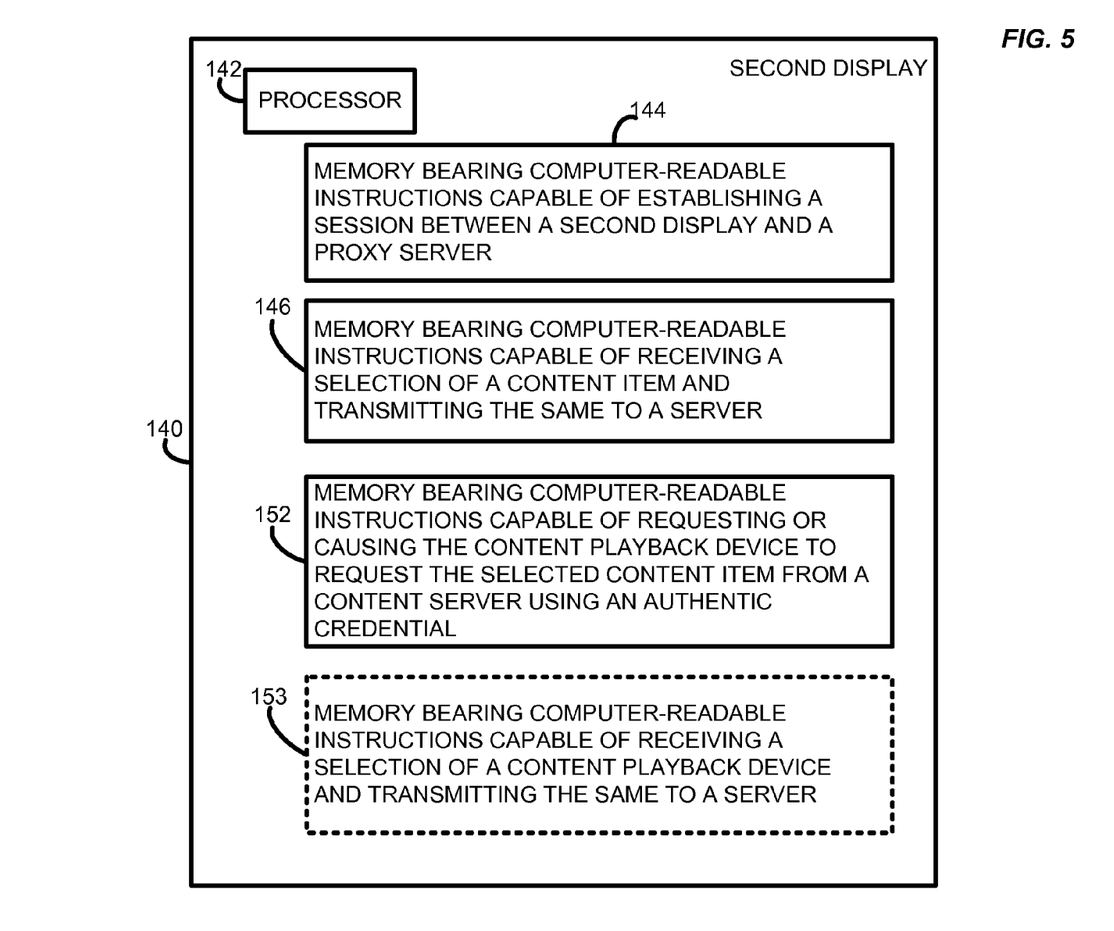
FIG. 5 is a block diagram of another exemplary second display system in accordance with the present principles.

Referring to FIG. 5, another implementation of a second display 140 is illustrated. In this implementation, the second display 140 includes a processor 142. The second display 140 further includes memory 144 bearing computer readable instructions capable of establishing a session between the second display and a proxy server, e.g., via a local network. The second display 140 further includes memory 146 bearing computer readable instructions capable of receiving a selection of the content item and transmitting the selection to a server or to a content playback device. For example, if the second display 140 displays a list of content items available from a service provider, the memory 146 would allow the device to receive a selection from a user of a particular content item to be played back. The second display 140 further includes memory 152 bearing computer readable instructions capable of causing the content playback device to request the selected content item from a content server using an authentication credential and via transmitting the selection to a server or to a content playback device. If to a server, such as a proxy server, the same may present the selection to the proxy server on behalf of the content playback device using the content playback device's authentication credentials. If directly to the content playback device, the content playback device may simply request the content item directly. The second display 140 may further include optional memory 153 bearing computer readable instructions capable of receiving a selection of a content playback device and transmitting the same to a server.

Figure 6:
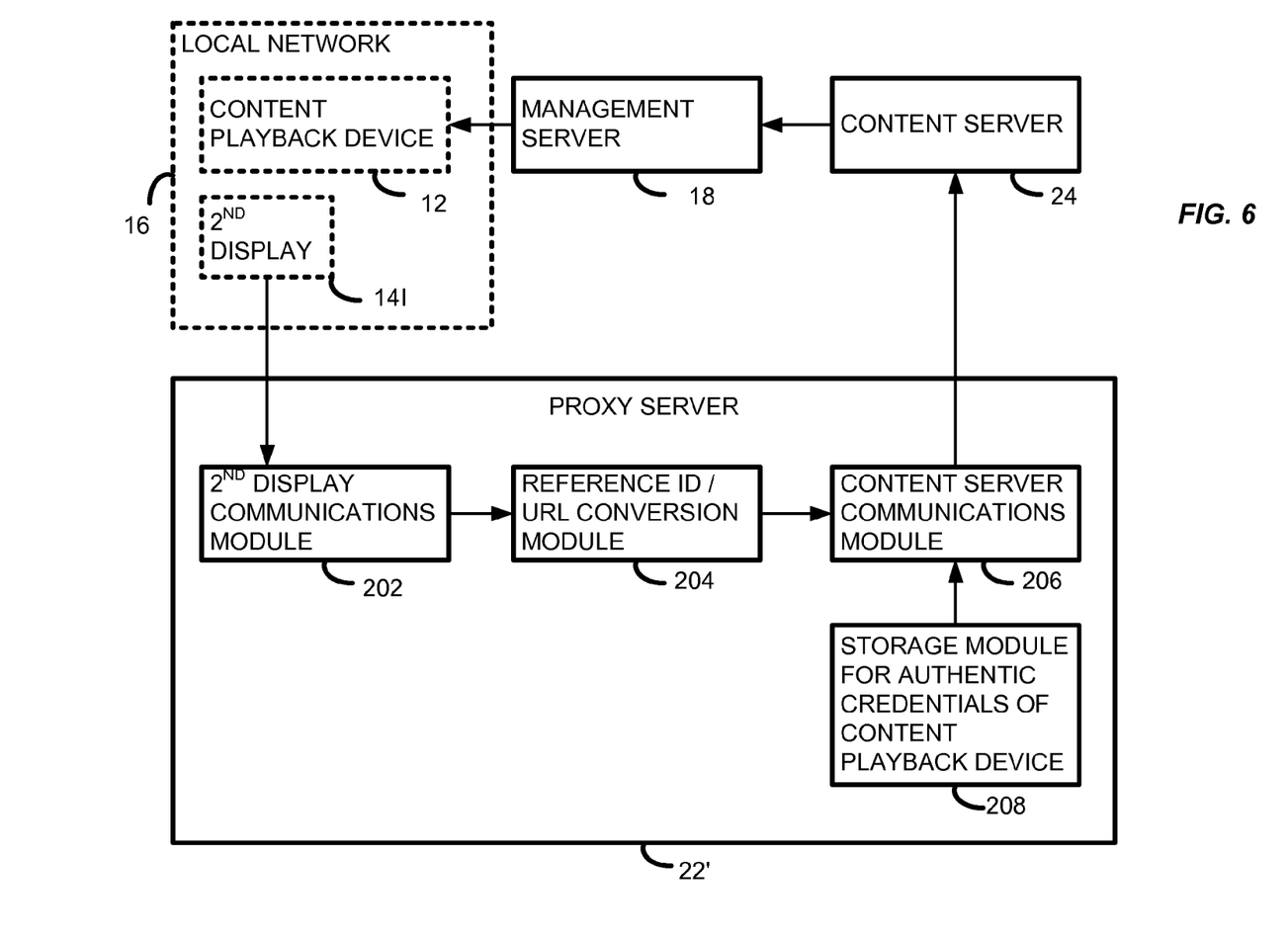
FIG. 6 is a block diagram of an exemplary proxy server in accordance with the present principles.

Referring to FIG. 6, details of a proxy server 22' are illustrated. The proxy server 22' includes a second display communications module 202 which performs communications with the second display 14i, e.g., to provide lists of content playback devices, service providers, content items, and the like. In turn, the proxy server 22' receives from the second display 14i selections of service providers, content playback devices, and content items associated with service providers. The proxy server 22' further includes a storage module 208 which stores, among other things, authentication credentials of content playback devices associated with the user account. The proxy server 22' also includes a content server communications module 206 which communicates with content servers 24 and/or with management servers 18 to arrange for selected content playback devices 12 to receive selected content items, or access to the same, as chosen by a user using the second display 14i. Finally, the proxy server 22' includes a reference ID/URL conversion module 204, which takes a playlist ID or reference identifier of the selected content item and converts the same to a content URL that may be employed by a service provider to arrange for a selected content item to be accessible by a content playback device 12.

Figure 7:
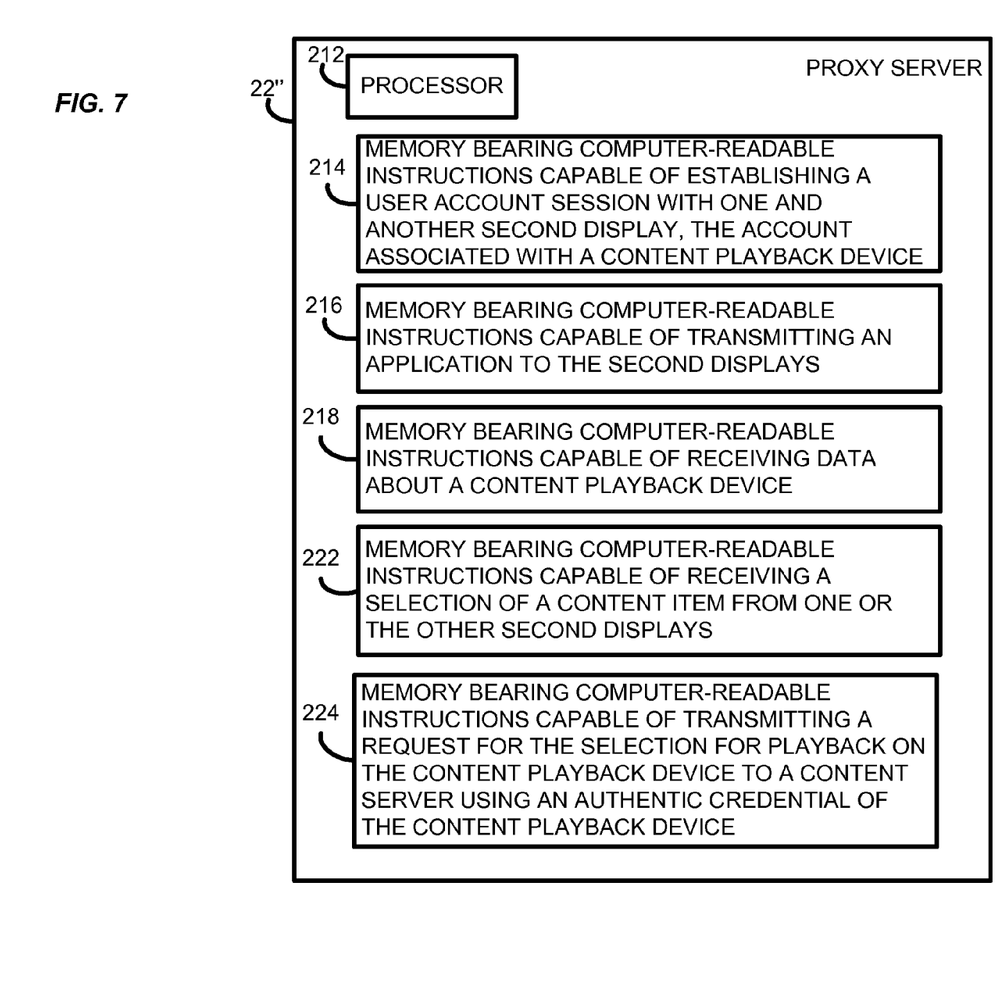
FIG. 7 is a block diagram of another exemplary proxy server in accordance with the present principles.

Referring to FIG. 7, another embodiment of a proxy server 22" is illustrated. The proxy server 22" includes a processor 212, which communicates with various memories to accomplish the principles described here. The proxy server 22" includes memory 214 bearing computer readable instructions capable of establishing a user account session with one and another second display, the user account associated with at least one content playback device. The proxy server 22" further includes memory 216 bearing computer readable instructions capable of transmitting a web application to the second displays. The proxy server 22" further includes memory 218 bearing computer readable instructions capable of receiving data about a content playback device associated with the user account. The proxy server 22" further includes memory 222 bearing computer readable instructions capable of receiving a selection of a content item from one or the other second displays. Finally, but without limitation, the proxy server 22" includes memory 224 bearing computer readable instructions capable of transmitting a request to a content server for playback of the selected content item on the content playback device, the request employing an authentication credential of the content playback device. This request may be transmitted through, e.g., a management server.

Systems and methods have been disclosed that allow improvement of the user experience of the IPTV without adding to the hardware costs of the unit. As disclosed above, multiple second display web applications may be used simultaneously to browse network services on behalf of an authenticated content playback device client because every display will be using the same session credentials. The system allows for convenient data entry further allows users to browse service providers on the side, without disturbing content playback on an IPTV.

Figure 8:
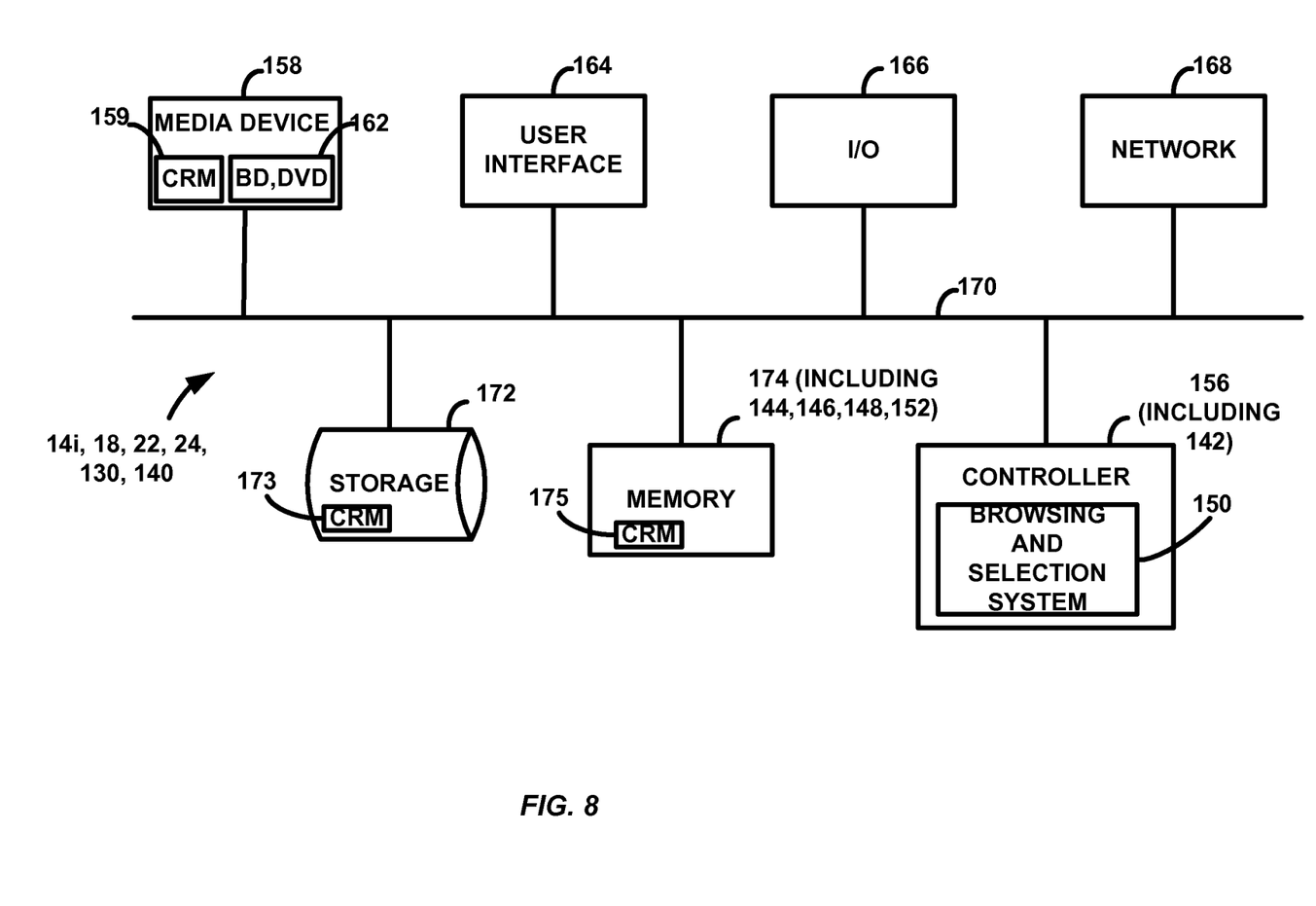
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, as well as for browsing and content selection. The second display functionality will be focused on here, but it will be understood that the various server functionality, e.g., that of the proxy server 22, management server 18, and content server 24, may also be accomplished with such components. Referring to FIG. 8, a representation of an exemplary computing environment for a second display 14i, 130, 140 is illustrated, e.g., a laptop, tablet, or smart phone. A user can employ the second display 14i to control a content playback device via the content, management, and/or proxy servers.

The second display 14i includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the second display 14i and its components for a browsing and selection system 150. The controller 156 loads instructions from the memory 174 or an embedded controller memory (not shown) and executes these instructions to control the system. In its execution, the controller 156 may provide the second display 14i control of a content playback device system 12 as, in part, a software system. Alternatively, this service can be implemented as separate modular components in the controller 156 or the second display 14i.

Memory 174, which may include non-transitory computer-readable memory 175, stores data temporarily for use by the other components of the second display 14i, and the same may include memories 144, 146, 152, and 153, as well as memories 214, 216, 218, 222, and 224 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display 14i, such as for storing data used by the system. In one implementation, storage 172 is a hard disc drive or a solid-state drive.

The media device 158, which may include non-transitory computer-readable memory 159, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the user content selections, from the user of the second display 14i and presenting information to the user. In one implementation, the user interface 164 includes a keyboard, a mouse, audio speakers, and a display. The controller 156 uses input from the user to adjust the operation of the second display 14i.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, or the like.

The second display 14i may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, while several implementations of the invention include that the user select a particular content playback device for playback, in some implementations a user may browse content with no content playback device selected at all. The user may also browse transactions like video rentals or home shopping purchases on the second display. The user may also request content items to be played back that are resident within the local network, e.g., content stored on a DVR or Blu-ray® player. While the system and method have described implementations in which content playback devices have been selected before browsing and where little or no reference to content playback devices is made, other variations are possible. For example, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

In addition, the above description was primarily directed to an implementation in which the local IP address of the second display was retrieved and stored on the server.

However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application. Furthermore, the web application for the second display may be implemented as a native application rather than a web application, although the web application implementation may enjoy certain benefits such as enhanced portability.

Accordingly, the present invention is not limited to only those implementations described above.

The invention claimed is:

1. A method of arranging multiple browsing sessions for content selection, the selected content for playback on a content playback device, comprising:
   i. establishing a common user account session between at least two second displays on a local network and a proxy server, the common user account session such that the at least two second displays act as one entity when communicating with service providers, the communicating occurring through the proxy server, the proxy server storing authentication credentials of content playback devices associated with the user account and forming a portion of a content delivery network, the second displays further having at least one content playback device coupled thereto through the local network;
   ii. receiving a selection of a content item on one of the at least two second displays; and
   iii. causing the content playback device to play back the selected content item, wherein the second display receiving the selection causes a request of the selected content item from a service provider using an authentication credential associated with the content playback device and not with the second display receiving the selection, the proxy server presenting the authentication credential to the service provider, such that the same authentication credential is used no matter which of the at least two second displays received the selection, and such that the second display receiving the selection appears to the service provider as the authenticated content playback device.

2. The method of claim 1, further comprising displaying a list of content items on at least one of the second displays, wherein the list is generated at least in part using a device characteristic of the content playback device.

3. The method of claim 1, further comprising displaying a list of content items on at least one of the second displays, wherein the list is generated at least in part using a list of content playback devices associated with the user account.

4. The method of claim 3, wherein the list is generated at least in part using a list of service providers associated with the user account.

5. The method of claim 1, further comprising displaying on at least one of the second displays a list of content playback devices associated with the user account, and receiving a selection of which content playback device is to play back the selected content item.

6. The method of claim 1, wherein the causing the content playback device to playback the selected content item includes causing the second display receiving the selection to communicate the selection to the content playback device, for the content playback device to subsequently request the content item.

7. The method of claim 1, wherein the causing the content playback device to playback the selected content item includes causing the second display receiving the selection to communicate the selection to the proxy server on behalf of the content playback device.

8. The method of claim 1, wherein the receiving a selection of a content item includes receiving a selection of a content item at the proxy server, and wherein the receiving at least a portion of the selected content item includes receiving a content URL at the content playback device.

9. The method of claim 1, wherein the establishing a session between a second display and a proxy server includes downloading an application from the proxy server to the second display.

10. A non-transitory computer-readable medium, comprising instructions for causing a computing device to implement the method of claim 1.

11. A computer program, stored on a non-transitory computer-readable medium, for causing one second display, the second display associated with at least one content playback device and at least another second display, to perform the following steps:
   i. establish a common session between at least two second displays on a local network and a proxy server associated with a content delivery network, the session associated with a user account on the proxy server, the common session such that the at least two second displays act as one entity when communicating with service providers, the communicating occurring through the proxy server, the proxy server storing authentication credentials of content playback devices associated with the user account;
   ii. receive an application from the proxy server on each of the at least two second displays;
   iii. execute the application to establish a browsing session on each of the at least two second displays;
   iv. receive data about at least one content playback device associated with the user account, the content playback device on the local network;
   v. receive a list at the second display of available content items from the proxy server, the list filtered by at least one device characteristic of the content playback device;
   vi. receive a selection of one or more of the available content items; and
   vii. transmit one or more reference identifiers identifying the one or more respective content items to the proxy server,
   viii. such that the one or more reference identifiers are configured to be employed at the proxy server with an authentication credential of the content playback device to request from one or more respective content servers that the one or more content items be made accessible for playback on the content playback device, wherein the same authentication credential of the content playback device is used no matter which second display performed the step of transmitting one or more reference identifiers, and such that the second display appears to the service provider as the authenticated content playback device.

12. The program of claim 11, wherein the step of receiving data about at least one content playback device associated with the user account includes: receiving a selection from a user of one or a set of content playback devices associated with the user account, using a default content playback device, or using stored data about previously-used content playback devices.

13. The program of claim 11, wherein the second display is selected from the group consisting of: a laptop computer, a tablet computer, an internet appliance, a desktop computer, and a smart phone.

14. The program of claim 11, wherein the list of available content items includes a list of available service providers.

15. The program of claim 11, wherein the step of transmitting one or more reference identifiers identifying the one or more respective content items to the proxy server includes transmitting the reference identifiers to the content playback device wherein the content playback device transmits a request to a service provider using its authentication credential for the identified content items.

16. The program of claim 15, wherein the transmitting includes transmitting using a transmission scheme including: wired transmissions, wireless transmissions, infrared transmissions, Bluetooth® transmissions, or over a local network.

17. The program of claim 11, wherein the step of transmitting one or more reference identifiers identifying the one or more respective content items to the proxy server includes transmitting the reference identifiers to the proxy server on behalf of the content playback device.

18. A computer program, stored on a non-transitory computer-readable medium, for causing a proxy server, the proxy server storing authentication credentials of content playback devices associated with the user account and associated with a content delivery network, to perform the following steps:
  i. receive a request to establish a session with one second display at a local network, and upon proper user authentication establish a session with the one second display, the session associated with a user account;
  ii. receive a request to establish a session with another second display at the local network, and upon proper user authentication add the another second display to the session with the one second display, so the one second display and the another second display form a common session and act as one entity when communicating with the content delivery network;
  iii. transmit to the one and the other second display an application, the application allowing the one and the other second display to review content offerings using the proxy server and using the authentication credential of a content playback device associated with the user account;
  iv. receive data about the content playback device;
  v. transmit to the one or another second display a list of available content items, the list filtered by a device characteristic of the content playback device;
  vi. receive from the one or another second display a selection of one or more content items for playback; and
  vii. transmit to a service provider a request for the one or more content items to be made available for playback on the content playback device, the request including the authentication credential of the content playback device.

19. The program of claim 18, wherein the step of receiving data about at least one content playback device associated with the user account includes: receiving a selection from a user of one or a set of content playback devices associated with the user account, using a default content playback device, or using stored data about previously-used content playback devices.

20. The program of claim 18, wherein the proxy server is further caused to perform the steps of:
  i. transmit to the one or another second display a list of available service providers;
  ii. receive from the one or another second display a selection of one or more service providers; and
  iii. provide to the selected service providers a service provider credential, the service provider credential associated with the user account and with the selected service provider.

21. The program of claim 20, wherein the proxy server is further caused to perform the step of receiving from the one or another second display a selection of one or more content items from the selected service provider for playback.

22. The program of claim 18, wherein the step of receiving from the one or another second display a selection of one or more content items for playback includes receiving from the one or another second display one more respective reference identifiers identifying the one or more respective content items.

23. The program of claim 18, wherein the transmitted list is customized based on at least the data about the content playback device.

* * * * *